Figure 1:
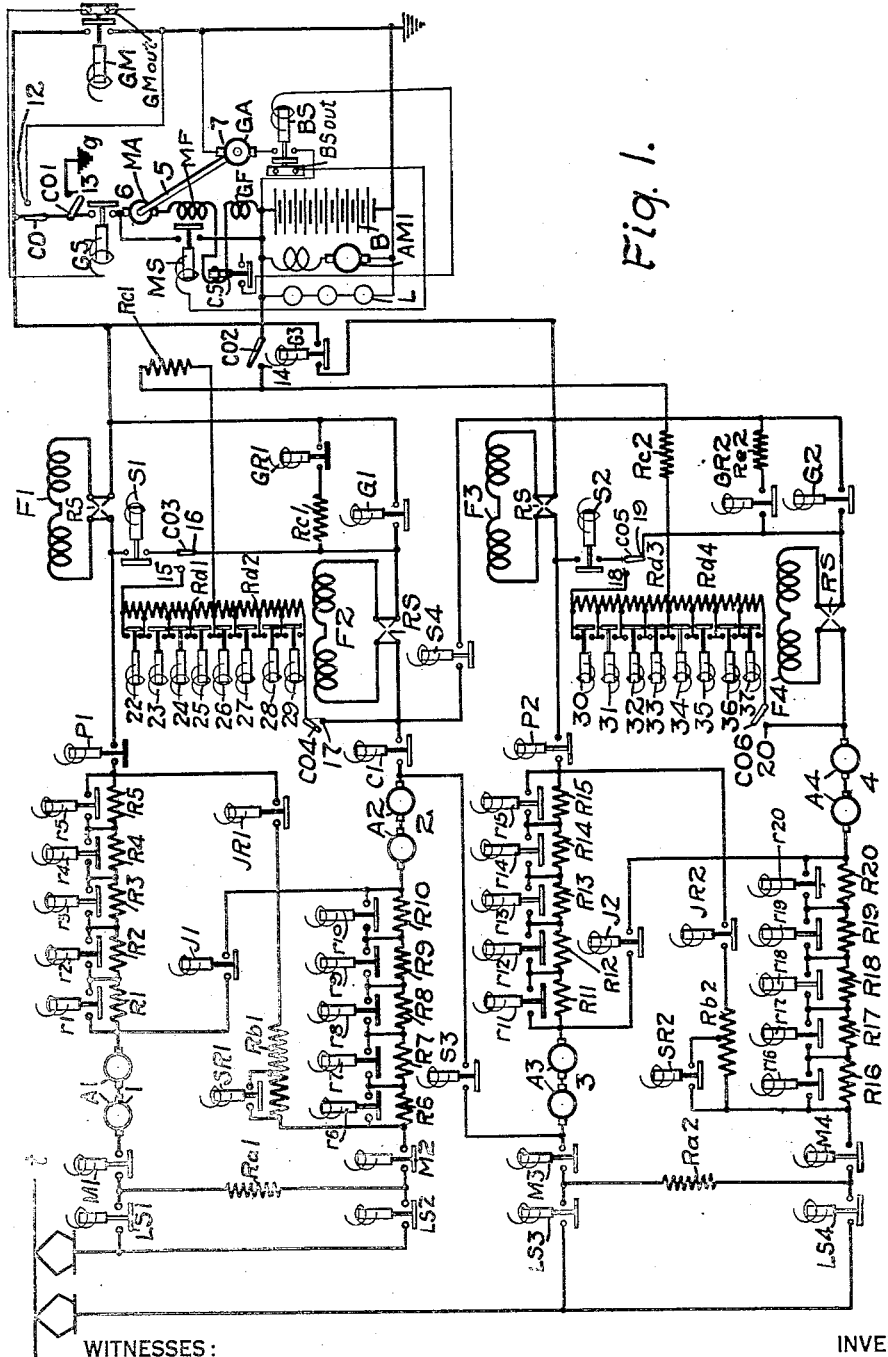

N. W. STORER.
SYSTEM OF CONTROL.
APPLICATION FILED MAY 16, 1916.

1,231,665.

Patented July 3, 1917.
3 SHEETS—SHEET 1.

WITNESSES:
R. J. Tidge
W. B. Wells

INVENTOR
Norman W. Storer.
BY
Wesley G. Carr
ATTORNEY

N. W. STORER.
SYSTEM OF CONTROL.
APPLICATION FILED MAY 16, 1916.

1,231,665.

Patented July 3, 1917.
3 SHEETS—SHEET 2.

Fig. 2.

Acceleration
Regeneration

Fig. 3.

WITNESSES:

INVENTOR
Norman W. Storer.
BY
ATTORNEY

N. W. STORER.
SYSTEM OF CONTROL.
APPLICATION FILED MAY 16, 1916.
1,231,665.
Patented July 3, 1917.
3 SHEETS—SHEET 3.
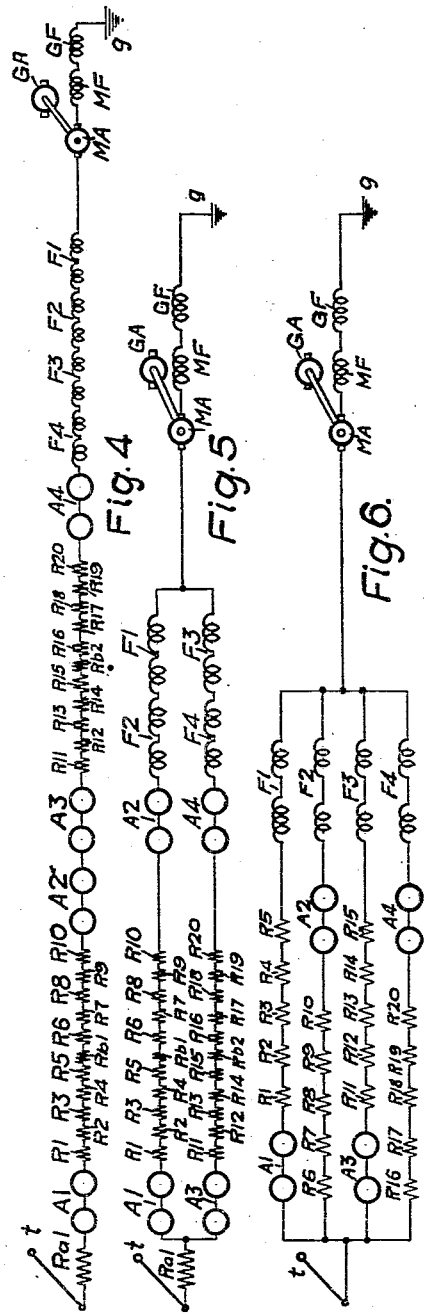
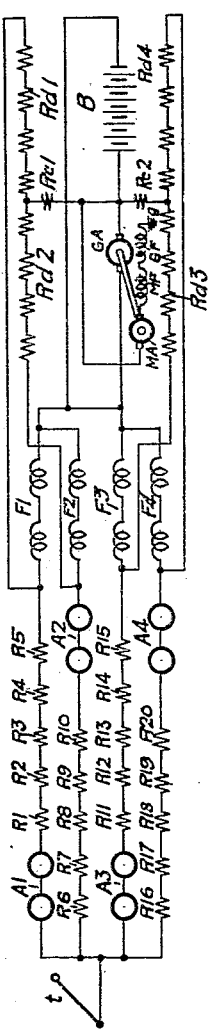
WITNESSES:
INVENTOR
Norman W. Storer.
BY
ATTORNEY

UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,231,665.  Specification of Letters Patent.  Patented July 3, 1917.

Application filed May 16, 1916. Serial No. 97,872.

*To all whom it may concern:*

Be it known that I, NORMAN W. STORER, a citizen of the United States, and a resident of Pittsburgh, in the county of Allegheny and State of Pennsylvania, have invented a new and useful Improvement in Systems of Control, of which the following is a specification.

My invention relates to systems of control for electric vehicles and particularly to systems that are connected to supply circuits having voltages that are too high for connecting the auxiliary motors and lights directly thereto.

One object of my invention is to provide a system of the above indicated character which shall have the lights and auxiliary motors thereof operated by energy received from a storage battery that is charged by the high-voltage supply circuit.

Another object of my invention is to provide a control system of the above indicated character in which the main propelling motors of the vehicle may be operated as generators when decelerating or when operating on a down-grade, and the lights and auxiliary motors thereof may be energized by a translating device that is energized by the current flowing through the main motors of the vehicle.

A further object of my invention is to provide a system of control of the above indicated character having a motor-generator set and a storage battery in series with the main propelling motors for supplying energy to the auxiliary motors and lights of the vehicle.

More specifically, my invention involves a control system for an electric locomotive the main propelling motors of which are adapted to be operated as motors in propelling the locomotive and as generators when the locomotive is decelerating or is operating on a down-grade. Between the ground return of the high-voltage supply circuit and the main motors is inserted the motor of a motor-generator set and a storage battery, the generator of the motor-generator set being connected to the storage battery, whereby the battery may be charged by the current flowing through the main motors when the latter are operated as motors and whereby the battery may be additionally charged by the motor-generator set receiving power from main motor current whether they are operated as motors or generators. The lights and the auxiliary motors of the vehicle are supplied with energy from the storage battery or from the generator of the motor-generator set.

In the accompanying drawing illustrating my invention, Figure 1 is a diagrammatic view of a regenerative control system constructed in accordance with my invention; Fig. 2 is a sequence chart indicating the sequence of operation of the switches illustrated in Fig. 1 during acceleration of the motors; Fig. 3 is a sequence chart indicating the sequence of operation of the switches illustrated in Fig. 1 during regeneration; Figs. 4 to 6, inclusive, are diagrammatic views indicating the motor circuits during acceleration, and Figs. 7 and 8 are diagrammatic views indicating the motor circuits during regeneration.

My invention, as set forth above, consists in providing means for obtaining a low-voltage current to energize the auxiliary motors and lights of a locomotive by means of a translating device inserted in series with the propelling motors of the locomotive. My invention is illustrated by means of a regenerative control system, but, it is to be understood that it is in no way limited to this type of system. The control system illustrated is simple in operation and not at all complicated in structure but embodies a great number of operative positions. No controller diagrams are illustrated for operating the switches in the system according to the sequence charts illustrated in Figs. 2 and 3 as the same would needlessly multiply the drawings without adding anything material to the disclosure set forth in the sequence charts. It is to be understood that any approved means may be used for operating the switches in the system according to the sequence charts shown in Figs. 2 and 3.

Referring to Fig. 1 of the drawings, motors 1, 2, 3 and 4, respectively comprising twin armatures A1, A2, A3 and A4 and field windings F1, F2, F3 and F4, are adapted to be connected in series, series-parallel and parallel-circuit relation across the supply circuit comprising conductors $t$ and $g$ by means of switches LS1, LS2, LS3, LS4, M1, M2, M3, M4, SR1, SR2, J1, J2, JR1, JR2, P1, P2, S1, S2, S3, S4, C1, G1, G2, GR1, GR2 and G3. Accelerating resistors R$a$1, R$a$2, R$b$1, R$b$2 and R1 to R20, inclusive, which are included in the circuit of the motors 1 to 4, inclusive, are adapted to be short circuited by means of the switches LS1, LS2, LS3, SR1, SR2 and $r$1 to $r$20, inclusive. Resistors R$e$1 and R$e$2 are adapted to form shunt circuits around the field windings F1 and F3, when the switches GR1 and GR2 are operated, so as to prevent the short circuiting of the field windings F1 and F3 during transition from series-parallel to parallel-circuit relation of the motors. A reversing switch RS is provided for reversing the circuit relation of the field windings F1 to F4, inclusive, relative to the armatures A1 to A4, inclusive.

Switches CO to CO6, inclusive, are provided for changing the circuit connections of the system to permit the motors 1 to 4, inclusive, to be operated as generators to regenerate energy when the locomotive is being decelerated or is being operated on a down-grade. When the system is operated to regenerate energy, the movable members of switches CO to CO6, inclusive, are operated so that the movable member of switch CO is disengaged from the contact terminal 11 and engages the contact terminal 12; the movable member of switch CO1 engages the contact terminal 13; the movable member of switch CO2 engages the contact terminal 14; the movable member of switch CO3 is disengaged from the contact terminal 16 and engages the contact terminal 15; the movable member of switch CO4 engages the contact terminal 17; the movable member of switch CO5 is disengaged from the contact terminal 19 and engages the contact terminal 18 and the movable member of switch CO6 engages the contact terminal 20. When the motors 1 to 4, inclusive, are operated as propelling motors, the movable members of switches CO, CO3 and CO5 are moved to respectively engage the contact terminals 11, 16 and 19.

A resistor C$c$1 is included in a circuit of a battery B which is closed through field windings F1 and F2 during regeneration, and a resistor R$c$2 is included in a circuit of the battery B which is closed through the field windings F3 and F4 during regeneration. The energizing circuits for the field windings F1 to F4, inclusive, also include resistors R$d$1, R$d$2, R$d$3 and R$d$4 which are adapted to be short circuited by means of switches 22 to 37, inclusive.

A motor-generator set 5 comprising a motor 6 having an armature MA and a field winding MF, and a generator 7, having an armature GA and a field winding GF, and the storage battery B are connected through the motors 1 to 4, inclusive, to the supply circuit. An auxiliary motor AM1 and lights L are connected in parallel to the storage battery B, and the generator armature GA is adapted to be connected in parallel to the storage battery by means of a switch BS. The motor of the motor-generator set and the battery B are adapted to be connected in series through the motors 1 to 4, inclusive, to the supply conductor by means of a switch GS, the switches GS and BS being operated by any approved means when the motors are connected to the supply circuit. A switch GM is provided for excluding the motor-generator set 5 and the battery B from the circuit of the motors 1 to 4, inclusive, and a switch MS is provided for excluding the motor-generator set from the motor circuit. The switches GM and BS are respectively provided with interlock switches designated GM-out and BS-out which are respectively interlocked with the operating coils of the switches GS and MS so as to prevent the simultaneous operation of the switches GM and GS and BS and MS. A current switch CS, having its energizing coil inserted in the circuit of the motor 6 of the motor-generator set 5, is inserted in the circuit of the coil of the switch BS to insure the release of the latter switch when current ceases to flow through the circuit of the motor 6.

With the system in the position illustrated in Fig. 5, the motors 1 to 4, inclusive, may be connected across the supply conductors $t$ and $g$ in series, series-parallel and parallel-circuit relation and be accelerated in thirty-three steps or positions as follows: in position 1, the switches LS2, M1, JR1, JR2, S3, S4, S1, S2, BS and GS are operated to complete a circuit which may be traced from the supply conductor $t$ through switch LS2, resistors R$a$1, switch M1, armature A1, resistors R1 to R5, inclusive, switch JR1, resistor R$b$1, resistors R6 to R70, inclusive, armature A2, switch S3, armature A3, resistors R11 to R15, inclusive, switch JR2, resistor R$b$2, resistors R16 to R20, inclusive, armature A4, field winding F4, switches CO5 and S2, field winding F3, switch S4, field winding F2, switches CO3 and S1, field winding F1, switches CO and GS, armature MA, field windings MF and GF and battery B to the ground conductor $g$. The motors A1 to A4, inclusive, are thus connected in series across the supply conductors $t$ and $g$, as illustrated in Fig. 4 of the drawings.

In position 2, the switch LS1 is operated to exclude the resistors R$a$1 from the motor circuit. In position 3, the switches SR1 and SR2 are operated to short circuit a portion of the resistors R$b$1 and R$b$2 from the motor circuit, and in positions 4 to 14, inclusive, the switches $r$1 to $r$20, inclusive, are operated in various pairs to short circuit the resistors R1 to R20, inclusive, and thus accelerate the motors 1 to 4, inclusive, while the same are connected in series-circuit relation across the supply conductors $t$ and $g$.

Between position 14, which is the last series position, and position 15, which is the first series-parallel position, are three transition positions for changing the motors from series to series-parallel relation by the familiar and well known shunting transition. In position 14, the switches J1 and J2 are operated to insure the short circuiting of the resistors R1 to R20, inclusive. In the first transition position, the switches LS1, J1, J2, SR1, SR2 and $r1$ to $r20$, inclusive, are released; in the second transition position, the switch C1 is energized and, in the third transition position, the switches S3 and S4 are released. In position 15, which is the first series-parallel position of the motors 1 to 4, inclusive, the switches LS2, LS4, M1, M3, JR1, JR2, C1, G3, S1, S2, BS and GS are operated to complete circuits in parallel through the motors 1 and 2 and the motors 3 and 4.

The circuit through the motors 1 and 2 may be traced from the supply conductor $t$ through the switch LS2, resistor $Ra1$, switch M1, armature A1, resistors R1 to R5, inclusive, switch JR1, resistor $Rb1$, resistors R6 to R10, inclusive, armature A2, switch C1, field winding F2, switches CO3 and S1, field winding F1, switches CO and GS, armature MA, field windings MF and GF and the battery B to the ground conductor $g$. The circuit through the motors 3 and 4 may be traced from the supply conductor $t$ through switch LS4, resistor $Ra2$, switch M3, armature A3, resistors R11 to R15, inclusive, switch JR2, resistor $Rb2$, resistors R16 to R20, inclusive, armature A4, field winding F4, switches CO5 and S2, field winding F3, switches G3, CO and GS, armature MA, field windings MF and GF and the battery B to the ground conductor $g$. Thus, the motors 1 to 4, inclusive, are connected in series-parallel-circuit relation across the supply conductors $t$ and $g$, as illustrated in Fig. 5 of the drawings.

In position 16, the switches LS1 and LS3 are operated to short circuit the resistors $Ra1$ and $Ra2$, respectively, from the circuits of the motors 1 to 4, inclusive; in position 17, the switches SR1 and SR2 are operated to short circuit portions of the resistors $Rb1$ and $Rb2$ and in positions 18 to 27, inclusive, the switches $r1$ to $r20$, inclusive, are operated to successively short circuit various pairs of the resistors R1 to R20, inclusive.

Between position 27, which is the last series-parallel position, and position 28, which is the first full-parallel position, are interposed four transition positions for changing the motors from series-parallel to parallel relation by the well known shunting transition. In the first transition position, the switches J1 and J2 are operated; in the second transition position, the switches JR1, JR2, SR1, SR2 and $r1$ to $r20$, inclusive, are released; in the third transition position, the switches M2, M4, P1, P2, GR1 and GR2 are energized and in the fourth transition position the switches J1, J2, S1 and S2 are released.

In position 28, the switches GR1 and GR2 are released and the switches G1 and G2 are operated to connect the motors 1 to 4, inclusive, in parallel-circuit relation across the supply conductors $t$ and $g$, as illustrated in Fig. 6 of the drawings. The circuit through the motor 1 may be traced from the supply conductor $t$ through switches LS1 and M1, armature A1, resistors R1 to R5, inclusive, switch P1, field winding F1, switches CO and GS, motor armature MA, field windings MF and GF and the battery B to the ground conductor $g$. The circuit through the motor 2 may be traced from the supply conductor $t$ through switches LS2 and M2, resistors R6 to R10, inclusive, armature A2, switch C1, field winding F2, switches G1, CO and GS, motor armature MA, field windings MF and GF and the battery B to the ground conductor $g$. The circuit through the motor 3 may be traced from the supply conductor $t$ through switches LS3 and M3, armature A3, resistors R11 to R15, inclusive, switch P2, field winding F3, switches G3, CO and GS, armature MA, field windings MF and GF and the battery B to the ground conductor $g$; and the circuit through the motor 4 may be traced from the supply conductor $t$ through the switches LS4 and M4, resistors R16 to R20, inclusive, armature A4, field winding F4, switches G2, G3, CO and GS, armature MA, field windings MF and GF and the battery B to the ground conductor $g$.

In positions 29 to 33, inclusive, the switches $r1$ to $r20$, inclusive, are successively operated in pairs to short circuit the resistors R1 to R20, inclusive.

In case the locomotive be operating on a down-grade and it is desired to regenerate energy, the switches in Fig. 1 are operated in accordance with the sequence chart illustrated in Fig. 3. However, before the main switches are operated in accordance to the sequence chart of Fig. 3, the movable members of the switches CO1, CO2, CO4 and CO6 are moved to respectively engage the contact terminals 13, 14, 17 and 20 and the movable members of the switches CO, CO3 and CO5 are moved to respectively engage the contact terminals 12, 15 and 18.

In the regenerating "off" position, the switches M1, M2, M3, M4, P1, P2, C1, G1, G2, G3, S1 and S2 are operated to complete circuits through the armatures A1 to A4, inclusive, and to connect the field windings F1 to F4, inclusive, to the battery B through the resistors R$d$1 to R$d$4, inclusive, R$c$1 and R$c$2. The energizing circuit of the field winding F1 may be traced from one terminal of the battery B through the switch CO2, resistors R$c$1 and R$d$1, switches CO3 and S1, field winding F1, and the switch CO to the other terminal of the battery B. The energizing circuit for the field winding F2 may be traced from one terminal of the battery B through the switch CO2, resistors R$c$1 and R$d$2, switch CO4, field winding F2 and the switches G1 and CO to the other terminal of the battery B. The energizing circuit for the field winding F3 may be traced from one terminal of the battery B through the switch CO2, resistors R$c$2 and R$d$3, switches CO5 and S2, field winding F3 and switches G3 and CO to the other terminal of the battery B; and the energizing circuit for the field winding F4 may be traced from one terminal of the battery B through the switch CO2, resistors R$c$2 and R$d$4, switch CO6, field winding F4 and switches G2, G3 and CO to the other terminal of the battery B.

In position 1, the switches LS1, LS2, LS3, LS4, M1, M2, M3, M4, P1, P2, C1, G1, G2, G3, BS, GS, S1 and S2 are operated to connect the armatures A1 to A4, inclusive, in parallel-circuit relation across the supply conductors $t$ and $g$, the field windings F1 to F4, inclusive, being energized by the battery B through the circuits above traced. The circuit through the armature A1 of the motor 1 may be traced from the supply conductor $t$ through switches LS1 and M1, armature A1, resistors R1 to R5, inclusive, switches P1, S1 and CO3, resistors R$d$1 and R$c$1, switch CO2, field windings GF and MF, armature MA and the switches GS and CO1 to the ground conductor $g$. The circuit through the armature A2 of the motor 2 may be traced from the supply conductor $t$ through the switches LS2 and M2, resistors R6 to R10, inclusive, armature A2, switches C1 and CO4, resistors R$d$2 and R$c$1, switch CO2, field windings GF and MF, armature MA and the switches GS and CO1 to the ground conductor $g$. The circuit through the armature A3 of the motor 3 may be traced from the supply conductor $t$ through the switches LS3 and M3, armature A3, resistors R11 to R15, inclusive, switches P2, S2 and CO5, resistors R$d$3 and R$c$2, switch CO2, field windings GF and MF, armature MA and switches GS and CO1 to the ground conductor $g$; and the circuit through the armature A4 of the motor 4 may be traced from the supply conductor $t$ through the switches LS4 and M4, resistors R16 to R20, inclusive, armature A4, switches C2 and CO6, resistors R$d$4 and R$c$2, switch CO2, field windings GF and MF, armature MA and switches GS and CO1 to the ground conductor $g$. The circuits completed through the armatures A1 to A4, inclusive, and through the field windings F1 to F4, inclusive, are illustrated in Fig. 7 of the drawings.

In positions 2 to 6, inclusive, the switches $r$1 to $r$20, inclusive, are successively operated in pairs to short circuit the resistors R1 to R20, inclusive, and in positions 7 to 10, inclusive, the switches 22 to 37, inclusive, are successively operated in pairs to short circuit the resistors R$d$1 to R$d$4, inclusive.

Between position 10, which is the last parallel position during regeneration and position 11, which is the first series-parallel position, three transition positions are interposed for effecting transition by the well known shunting transition. In the first transition position, the switches $r$1 to $r$20, inclusive, and 22 to 37, inclusive, are released; in the second transition position, the switches JR1 and JR2 are operated and in the third transition position, the switches M2, M4, P1 and P2 are released.

In position 11, which is the first series-parallel position during regeneration, the switches LS1, LS2, LS3, LS4, M1, M3, JR1, JR2, C1, G1, G2, G3, BS, GS, S1, S2, SR1 and SR2 are operated to connect the armatures A1 to A4, inclusive, in series parallel-circuit relation across the supply conductors $t$ and $g$, as illustrated in Fig. 8 of the drawings. The energization circuits of the field windings F1 to F4, inclusive, from the battery B are similar to those traced for position 1.

The circuit through the armatures A1 and A2 may be traced from the supply conductor $t$ through the switches LS1 and M1, armature A1, resistors R1 to R5, inclusive, switch JR1, a portion of the resistor R$b$1, switch SR1, resistors R6 to R10, inclusive, armature A2, switches C1 and CO4, resistors R$d$2 and R$c$1, switch CO2, field windings GF and MF, armature MA and switches GS and CO1 to the ground conductor $g$. The circuit through the armatures A3 and A4 may be traced from the supply conductor $t$ through the switches LS3 and M3, armature A3, resistors R11 to R15, inclusive, switch JR2, resistor R$b$2, switch SR2, resistors R16 to R20, inclusive, armature A4, switch CO6, resistors R$d$4 and R$c$2, switch CO2, field windings GF and MF, armature MA and the switches GS and CO1 to the ground conductor $g$.

In positions 12 to 16, inclusive, the switches $r$1 to $r$20, inclusive, are successively operated in pairs to short circuit, the resistors R1 to R20, inclusive, and in positions 17 to 20, inclusive, the switches 22 to 37, inclusive, are successively operated in pairs to short circuit the resistors R$d$1, R$d$2, R$d$3 and R$d$4. In positions 16 to 20, inclusive, the switches J1 and J2 are operated to establish a short circuit around resistors R$b$1, R$b$2 and R1 to R20, inclusive.

In operating the motors illustrated in Fig. 1 as propelling motors, the motor-generator set 5 is energized to additionally charge the battery B and thus supply energy to the auxiliary motors and lights of the locomotive. In case the motors in Fig. 1 be operated as generators, the battery B serves as a source of energy for energizing the field windings F1 to F4, inclusive, the motor-generator set 5 being energized by the current generated by the motors 1 to 4, inclusive, to charge the battery B.

Various modifications in the specific circuit connections and arrangement of parts herein set forth may be made within the scope and spirit of my invention, and I desire, therefore, that only such limitations shall be imposed as are indicated in the appended claims.

I claim as my invention:

1. In a system of control, the combination with a supply circuit and a plurality of propelling motors connected thereto, of a motor-generator set and a storage battery connected in series through the propelling motors to the supply circuit.

2. In a system of control, the combination with a supply circuit and a plurality of propelling motors connected thereto, a motor-generator set and a storage battery, of means for charging the storage battery and for operating the motor-generator set by the current flowing through the propelling motors, and means for charging the battery by the current generated by the motor-generator set.

3. In a system of control, the combination with a supply circuit and a plurality of propelling motors connected thereto, of a storage battery connected to the supply circuit through the propelling motors, a motor-generator set having the generator field winding and the motor thereof connected to the supply circuit through the propelling motors, and means for charging the battery from the motor-generator set.

4. In a system of control, the combination with a supply circuit, a plurality of propelling motors, and means for connecting the motors to the supply circuit in series, series-parallel and parallel-circuit relation, of a motor-generator set comprising a motor and a generator, a storage battery, and means for connecting the motor of said motor-generator set and said battery to the supply circuit through said propelling motors.

5. In a system of control, the combination with a supply circuit and a plurality of propelling motors connected thereto, of a motor-generator set operated by the current flowing through said propelling motors, a storage battery, and means for charging said battery by the current flowing through said propelling motors and by the current generated by the motor-generator set.

6. In a system of control, the combination with a supply circuit and a plurality of propelling motors connected thereto, of a motor-generator set comprising a motor and a generator, a storage battery, the motor of said set and the storage battery being connected in series through the propelling motors to the supply circuit, and means for excluding the motor-generator set from the circuit of the propelling motors and for inserting the storage battery directly between the propelling motors and one side of the supply circuit.

7. In a system of control, the combination with a supply circuit and a plurality of motors connected thereto, of a storage battery and a motor-generator set connected in series through the propelling motors to the supply circuit, means for charging the battery from said motor-generator set and means for excluding the motor-generator set from the circuit of the propelling motors and for charging the battery by the current flowing through the propelling motors.

8. In a system of control for an electric vehicle, the combination with a supply circuit and a plurality of propelling motors connected thereto, of a storage battery connected through said propelling motors to the supply circuit, a dynamo-electric machine, and means for energizing the dynamo-electric machine by the current flowing through the propelling motors to charge the battery.

9. In a system of control, the combination with a supply circuit and a plurality of propelling motors connected thereto, of a motor-generator set comprising a motor and a generator, a storage battery, means for connecting the battery, the armature and field winding of said motor and the generator field winding in series through the propelling motors to the supply circuit, auxiliary motors and lights connected in parallel to the battery and means for connecting the armature of the generator of the motor-generator set in parallel with the storage battery.

10. In a system of control for an electric vehicle, the combination with a supply circuit and a plurality of propelling motors connected thereto, of a motor-generator set comprising a motor having an armature and a field winding and generator having an armature and a field winding, a storage battery, an auxiliary motor for the vehicle and means for connecting the auxiliary motor, the storage battery and the generator armature in parallel relation as to each other and in series to said motor armature and field winding and generator field winding through the propelling motors to the supply circuit.

11. In a system of control, the combination with a plurality of dynamo-electric machines, a storage battery, and a motor-generator set, of means for operating said machines as motors and as generators, means for energizing the motor-generator set by the current flowing through said machines whether the latter are operated as motors or as generators, means for charging the battery by the current flowing through the machines when the latter are operated as motors, and means for additionally charging the battery by the motor-generator set.

12. In a system of control, the combination with a plurality of dynamo-electric machines, a storage battery, and a motor-generator set, of means for operating said machines as motors and as generators, means for charging the battery and for energizing the motor-generator set by the current flowing through the dynamo-electric machines when the latter are operating as motors, and means for charging the battery by the motor-generator set whether said machines are operating as motors or as generators.

13. In a system of control, the combination with a supply circuit, a plurality of dynamo-electric machines, a storage battery and a motor-generator set comprising a motor and a generator, of means for connecting said machines to be operated as motors and as generators, means for connecting the motor of said set in series with the storage battery through said machines to the supply circuit and for connecting the terminals of the generator armature across the storage battery, whereby the battery may be charged by the current flowing through the dynamo-electric machines and by the current generated by the motor-generator set when said machines are operating as motors.

14. In a system of control, the combination with a supply circuit, a plurality of dynamo-electric machines, means for energizing said dynamo-electric machines as motors from the supply circuit and for operating said machines as generators to regenerate energy, of a storage battery and a motor-generator set connected in series to the dynamo-electric machines, whereby the battery may be charged and the motor-generator set energized by the current flowing through the dynamo-electric machines.

15. In a system of control, the combination with a plurality of dynamo-electric machines, means for operating said machines as motors and as generators, a storage battery, and a motor-generator set comprising a motor having an armature and a field winding and a generator having an armature and a field winding, of means for connecting said motor armature and field winding, the generator field winding and the storage battery in series relation to the dynamo-electric machines when said machines are operating as motors.

16. In a system of control, the combination with a plurality of dynamo-electric machines having armatures and field windings, a storage battery, and a motor-generator set comprising a motor and a generator, of means for operating said machines as motors and as generators, means for energizing the motor-generator and for charging the battery by the current flowing through said machines, and means for energizing the field windings of the dynamo-electric machines by the storage battery.

17. In a system of control, the combination with a plurality of dynamo-electric machines having armatures and field windings, a storage battery, and a motor-generator set comprising a motor having an armature and a field winding and a generator having an armature and a field winding, of means for operating said machines as motors and as generators, means for connecting the armature and field winding of the motor, the field winding of the generator and the storage battery in series to the dynamo-electric machines to energize the motor-generator set and to charge the storage battery, and means for energizing the field windings of the dynamo-electric machines by the storage battery when said machines are operated as generators.

18. In a system of control, the combination with a plurality of dynamo-electric machines, a storage battery, and a motor-generator set comprising a motor having an armature and a field winding and a generator having an armature and a field winding, of means for operating said machines as motors and as generators, means for connecting the armature and field winding of said motor, the generator field winding and the storage battery in series to said dynamo-electric machines to energize the motor-generator set and to charge the battery when the dynamo-electric machines are operated as motors.

19. In a system of control, the combination with a plurality of dynamo-electric machines, a storage battery and a motor-generator set comprising a motor having an armature and a field winding, of means for operating said machines as motors and as generators, means for connecting the armature and field winding of the motor of the motor-generator set, the generator field winding and the storage battery to said dynamo-electric machines to energize the motor-generator set and to charge the battery when the dynamo-electric machines are operated as motors and means for charging the battery by the motor-generator set whether said machines are operated as motors or as generators.

20. In a system of control, the combination with a plurality of dynamo-electric machines having armatures and field windings, a storage battery, and a motor-generator set, of means for operating said machines as motors and as generators, means for energizing the motor-generator set and for charging the battery by the current flowing through the dynamo-electric machines, means for charging the battery by the motor-generator set whether said machines are operated as motor or as generators and means for energizing the field windings of the dynamo-electric machines by the storage battery when said machines are operated as generators.

In testimony whereof, I have hereunto subscribed my name this 29th day of April, 1916.

NORMAN W. STORER.

---

Corrections in Letters Patent No. 1,231,665.

It is hereby certified that in Letters Patent No. 1,231,665, granted July 3, 1917, upon the application of Norman W. Storer, of Pittsburgh, Pennsylvania, for an improvement in "Systems of Control," errors appear in the printed specification requiring correction as follows: Page 2, line 49, for the letters "Cc1" read *Rc1;* same page, line 109, for "R70" read *R10;* and that the said Letters Patent should be read with these corrections therein that the same may conform to the record of the case in the Patent Office.

Signed and sealed this 31st day of July, A. D., 1917.

[SEAL.]

Cl. 172-179

F. W. H. CLAY,
*Acting Commissioner of Patents*